UNITED STATES PATENT OFFICE.

ALEXANDER G. GEORGE, OF NEW LEXINGTON, OHIO.

FIRE-PROOF COMPOUND AND ARTICLES MADE FROM THE SAME.

SPECIFICATION forming part of Letters Patent No. 343,810, dated June 15, 1886.

Application filed January 29, 1886. Serial No. 190,216. (No specimens.)

*To all whom it may concern:*

Be it known that I, ALEXANDER G. GEORGE, a citizen of the United States, and a resident of New Lexington, in the county of Perry and State of Ohio, have invented certain new and useful Improvements in Fire-Proof Compounds and Articles Made from the Same; and I do hereby declare that the following is a full, clear, and exact description of the invention, which will enable others skilled in the art to which it appertains to make and use the same, reference being had to this specification.

My invention has relation to compounds for repairing fire-places in stoves, boiler-furnaces, gas-retorts, or all similar places exposed to intense heat, and for manufacturing bricks, blocks, or retorts or similar articles to be used in places exposed to intense heat, and it contemplates certain improvements upon the compound for which Letters Patent No. 314,182 were granted to Ephraim Ivett and myself on the 17th day of March, 1885; and it consists in the improved combination of elements, as hereinafter more fully described and claimed.

The compound consists of the following ingredients in about the following proportions, viz: hard fire-clay burned and pulverized, twelve pounds; potters' clay, two pounds; argillaceous slate, four pounds; black-lead, three ounces; sawdust, two ounces; quicklime, fourteen ounces; and copperas, four ounces.

This compound is made into a plastic mass, and may either be used for the purpose of repairing or building fire-places in stoves, furnaces for steam boilers or heaters, gas-retorts, or fire-places for the same, or any other places where intense heat is created, the compound burning by the heat and becoming hardened into one mass with the bricks, blocks, or plates upon which it has been used, without vitrifying, and without having cinders, slag, or lava fusing with it. The compound is also very suitable for making bricks or plates or blocks for building fire-proof fire-places or furnaces, retorts, crucibles, or any other articles which are exposed to great heat, and the articles or structures made out of this compound will not be affected by the heat, and will not have any cinders, slag, or clinkers from a fire fusing with them, nor will they be vitrified or in the least degree affected by the heat. The compound may also be used for the purpose of lining or coating walls or metallic plates exposed to hot fires, and for protection of all objects subjected to intense heat, for lining converters in the Bessemer process of treating steel, the compound being shaped into lining-bricks, which are secured by a mortar consisting of the compound in a plastic state, for linings and building in blast-furnaces or other buildings for smelting and converting steel and iron—in short, for any purpose where a wall, lining, retort, or vessel is subjected to intense heat.

Having thus described my invention, I claim and desire to secure by Letters Patent of the United States—

1. An improved plastic compound for repairing or building or forming fire-proof articles or structures, consisting of hard fire-clay burned and ground, potters' clay, argillaceous slate, black-lead, sawdust, quicklime, and copperas mixed in water, in about the hereinnamed proportions.

2. A fire-proof brick or similar article composed of the following ingredients, viz: hard-burned and ground fire-clay, potters' clay, argillaceous slate, black-lead, sawdust, quicklime, and copperas, mixed, shaped, and burned into its desired form, as and for the purpose shown and set forth.

In testimony that I claim the foregoing as my own I have hereunto affixed my signature in presence of two witnesses.

ALEXANDER G. GEORGE.

Witnesses:
JAMES D. RETALLIE,
EDWARD MACKIN.